US009771836B2

(12) United States Patent
Tsukahara et al.

(10) Patent No.: US 9,771,836 B2
(45) Date of Patent: Sep. 26, 2017

(54) INTERNAL COMBUSTION ENGINE

(71) Applicant: TOYOTA JIDOSHA KABUSHIKI KAISHA, Toyota-shi, Aichi-ken (JP)

(72) Inventors: Takeshi Tsukahara, Nagoya (JP); Kengo Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 15/047,958

(22) Filed: Feb. 19, 2016

(65) Prior Publication Data
US 2016/0258328 A1    Sep. 8, 2016

(30) Foreign Application Priority Data

Mar. 2, 2015   (JP) ................................. 2015-040424

(51) Int. Cl.
| *F01L 1/02* | (2006.01) |
| *F01L 1/047* | (2006.01) |
| *F02F 7/00* | (2006.01) |
| *F16J 15/14* | (2006.01) |
| *F01L 1/053* | (2006.01) |

(52) U.S. Cl.
CPC .............. *F01L 1/022* (2013.01); *F01L 1/047* (2013.01); *F02F 7/0073* (2013.01); *F16J 15/14* (2013.01); *F01L 2001/0537* (2013.01); *F02F 2007/0075* (2013.01)

(58) Field of Classification Search
CPC ......... F01L 1/022; F01L 1/047; F02F 7/0073; F02F 2007/0075
USPC ................................ 123/90.16, 90.27, 90.31
See application file for complete search history.

(56) References Cited

U.S. PATENT DOCUMENTS 9,097,147 B2 *   8/2015   Tadokoro ................ F01L 1/344
                                                        123/90.17

FOREIGN PATENT DOCUMENTS

JP    2012-137044    5/2012

* cited by examiner

*Primary Examiner* — Ching Chang
(74) *Attorney, Agent, or Firm* — Oliff PLC

(57) ABSTRACT

An internal combustion engine includes a cylinder head, a crankshaft, intake and exhaust camshafts, first and second chain covers, a chain, and a fastening bolt. The first chain cover having a cutout includes a first flange positioned at a specific edge portion of the cutout, which is positioned between the crankshaft and the camshafts, and a first boss through which a shaft portion of the fastening bolt is passed. The cylinder head includes a second flange, and a second boss into which the shaft portion is inserted, and which is disposed coaxially with the first boss. The liquid gasket is held between the second flange and the first flange. A groove is provided in at least one of a position between the first flange and the first boss of the first chain cover and a position between the second flange and the second boss of the cylinder head.

4 Claims, 4 Drawing Sheets

INTERNAL COMBUSTION ENGINE

INCORPORATION BY REFERENCE

The disclosure of Japanese Patent Application No. 2015-040424 filed on Mar. 2, 2015 including the specification, drawings and abstract is incorporated herein by reference in its entirety.

BACKGROUND OF THE INVENTION

1. Field of the Invention

The invention relates to an internal combustion engine in which chain covers are secured to a cylinder head with a fastening bolt.

2. Description of Related Art

Japanese Patent Application Publication No. 2012-137044 (JP 2012-137044 A) describes an example of an internal combustion engine in which a chain cover is secured to a cylinder head with a fastening bolt. In such an internal combustion engine, a chain that transmits the rotation of a crankshaft to camshafts is disposed in a space defined between the cylinder head and the chain cover.

In some internal combustion engines, a first chain cover and a second chain cover are secured to a cylinder head with a fastening bolt. For example, the first chain cover is attached to the cylinder head, and the second chain cover is attached to the first chain cover. A chain is disposed in a space defined between the first chain cover and the second chain cover.

In such an internal combustion engine, a liquid gasket, such as a formed-in-place gasket (FIPG), may be provided between the first chain cover and the cylinder head.

More specifically, the first chain cover is provided with a cutout so as to avoid contact with camshafts that project from the cylinder head in their axial direction. Due to the cutout provided in the first chain cover in the above-described manner, a portion of the peripheral edge of the first chain cover is positioned between a crankshaft and the camshafts. The portion of the peripheral edge of the first chain cover, the portion being positioned between the crankshaft and the camshafts, will be referred to as "specific edge portion". A flange is provided at the specific edge portion of the first chain cover. Further, a flange is provided at a portion of the cylinder head, the portion facing the specific edge portion. The liquid gasket is interposed between these flanges. The liquid gasket is brought into close contact with these flanges. As a result, the sealing performance of an area between the flanges is enhanced.

When the chain covers are secured to the cylinder head with the fastening bolt, edge portions of the peripheral edge of the first chain cover other than the edge portion formed due to the provision of the cutout in the first chain cover are pressed toward the cylinder head by the peripheral edge of the second chain cover, but the specific edge portion of the first chain cover is not pressed toward the cylinder head by the second chain cover. Thus, a force with which the liquid gasket is held by the flanges is not so large. This makes it difficult to enhance the degree of close contact between the flanges and the liquid gasket. Thus, it is difficult to enhance the sealing performance of the area between the flanges.

In order to enhance the sealing performance of the area between the flanges, it is desirable to provide a boss through which a shaft portion of the fastening bolt is passed, near each of the flanges. Thus, an axial force generated by tightening the fastening bolt is transmitted to the liquid gasket. This increases the force with which the liquid gasket is held by the flanges. As a result, the degree of close contact between the liquid gasket and the flanges is enhanced, leading to enhancement in sealing performance of the area between the flanges.

Next, steps of securing each of the chain covers to the cylinder head will be described. In a first step, an uncured liquid gasket is applied to at least one of the flange of the first chain cover and the flange of the cylinder head, and the first chain cover is attached to the cylinder head. In a second step, a chain is looped over the crankshaft and the camshafts. In a third step, the second chain cover is attached to the first chain cover. In a fourth step, the chain covers are secured to the cylinder head by tightening the fastening bolt.

SUMMARY OF THE INVENTION

In a case where the chain covers are secured to the cylinder head through a plurality of steps as described above, the chain covers are secured to the cylinder head with the fastening bolt after a lapse of a certain period of time from application of the liquid gasket to at least one of the flanges. In other words, in some cases, after the liquid gasket applied to at least one of the flanges in the first step starts curing, the chain covers are secured to the cylinder head with the fastening bolt in the fourth step. In this case, the above-described axial force is transmitted to the hard liquid gasket. When the boss is provided near each of the flanges, the axial force transmitted to the liquid gasket becomes excessively large, which may result in a decrease in durability of the liquid gasket.

The axial force to be transmitted to the liquid gasket held by the flanges can be reduced by reducing a tightening force generated by tightening the fastening bolt. However, in this case, a decrease in durability of the liquid gasket is inhibited, but a force with which the chain covers are secured to the cylinder head is reduced.

The invention provides an internal combustion engine configured such that a decrease in durability of a liquid gasket is inhibited without the need to reduce a tightening force generated by tightening a fastening bolt.

An internal combustion engine according to an aspect of the invention includes a cylinder head, a crankshaft, an intake camshaft, an exhaust camshaft, a first chain cover, a second chain cover, a chain, and a fastening bolt. The intake camshaft and the exhaust camshaft are disposed in the cylinder head. The first chain cover is disposed in contact with the cylinder head. The second chain cover is disposed in contact with the first chain cover. The chain is looped over the crankshaft, the intake camshaft, and the exhaust camshaft. The chain is disposed in a space defined by the first chain cover and the second chain cover. The fastening bolt fastens the first chain cover and the second chain cover to the cylinder head. The first chain cover includes an edge portion defining a cutout such that the intake camshaft and the exhaust camshaft are positioned in a space in the cutout. A portion of a peripheral edge portion of the cutout is a specific edge portion positioned between the crankshaft and the intake and exhaust camshafts. The first chain cover includes a first flange positioned at the specific edge portion and a first boss through which a shaft portion of the fastening bolt is passed. The first boss is disposed adjacent to the first flange, and the first boss is located on the crankshaft side with respect to the first flange. The cylinder head includes a second flange that holds a liquid gasket in cooperation with the first flange in such a manner that the liquid gasket is held between the second flange and the first flange, and a second boss into which the shaft portion of the fastening bolt is inserted. The second boss is disposed coaxially with the first boss. A groove is provided in at least one of a position between the first flange and the first boss of the first chain cover and a position between the second flange and the second boss of the cylinder head.

According to the above aspect, in the process of attaching the first chain cover, the chain, and the second chain cover to the cylinder head, first, the liquid gasket, which has not been cured, is applied to at least one of the first flange and the second flange, and the first chain cover is attached to the cylinder head. Even when the first chain cover is attached to the cylinder head in this manner, the cutout provided in the first chain cover prevents the camshafts projecting from the cylinder head from being brought into contact with the first chain cover. Further, the liquid gasket applied to at least one of the first flange and the second flange is held between the first flange and the second flange. Subsequently, the chain is looped over the crankshaft and the camshafts. In this state, the second chain cover is attached to the first chain cover. Then, the chain covers are secured to the cylinder head with the fastening bolt.

In this case, at a stage before the chain covers are secured to the cylinder head with the fastening bolt, the liquid gasket interposed between the flanges may have already started curing. When the fastening bolt is tightened in this state, if an axial force applied to the hard liquid gasket is excessively large, durability of the liquid gasket may be decreased.

In view of this, according to the above aspect, although the first boss is positioned very close to the first flange and the second boss is positioned very close to the second flange, a groove is provided at least one of the position between the first flange and the first boss and the position between the second flange and the second boss. Thus, even when the shaft portion of the fastening bolt is inserted into the bosses and thus an axial force is generated, transmission of the axial force to the liquid gasket is restricted by the groove. In other words, the axial force to be transmitted to the liquid gasket is prevented from being excessively large, and thus the liquid gasket is less likely to be damaged. As a result, a decrease in durability of the liquid gasket is inhibited without the need to reduce a tightening force generated by tightening the fastening bolt.

In the internal combustion engine according to the above aspect, the first boss and the second boss may be positioned between the intake camshaft and the exhaust camshaft in a direction in which the intake camshaft and the exhaust camshaft are arranged side by side. According to this aspect, an axial force generated by tightening the fastening bolt is transmitted to the entirety of the liquid gasket positioned between the first flange and the second flange. As a result, sealing performance provided by the flanges and the liquid gasket is easily ensured.

In the internal combustion engine according to the above aspect, a width of the groove may be smaller than a width of each of a peripheral wall of the first boss and a peripheral wall of the second boss. According to this aspect, the degree of close contact between the flanges and the liquid gasket is enhanced by an axial force generated by tightening the fastening bolt.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
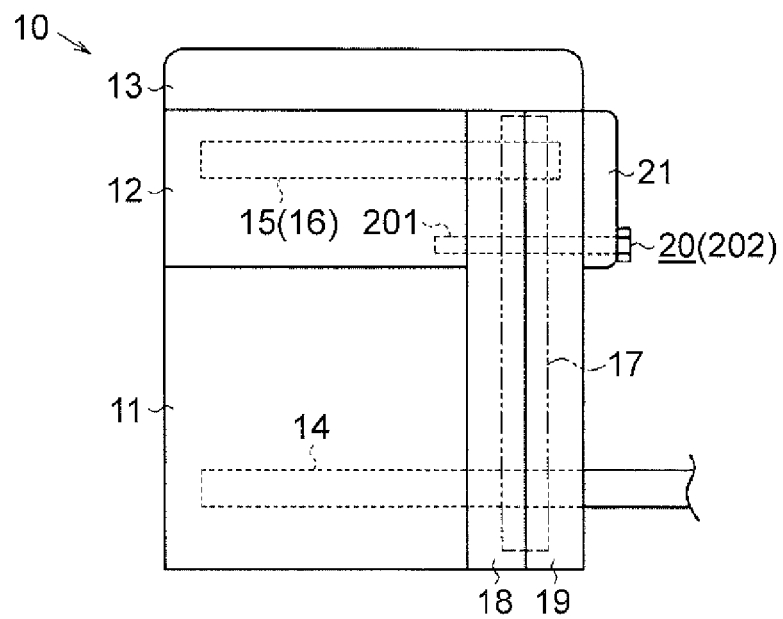
FIG. 1 is a side view schematically illustrating an internal combustion engine according to an embodiment.
Figure 2:
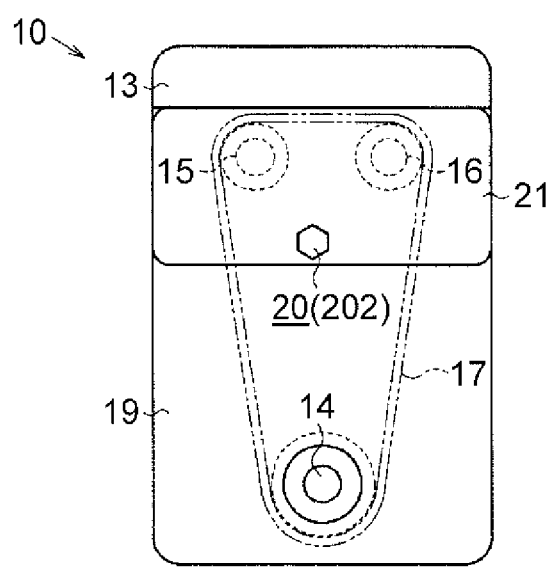
FIG. 2 is a front view of the internal combustion engine.

Hereinafter, an internal combustion engine according to an embodiment will be described with reference to FIGS. 1 to 7. As illustrated in FIG. 1 and FIG. 2, an internal combustion engine 10 includes a cylinder block 11, a cylinder head 12 secured to an upper portion (in FIG. 1 and FIG. 2) of the cylinder block 11, and a cylinder head cover 13 that covers an upper portion (in FIG. 1 and FIG. 2) of the cylinder head 12. The internal combustion engine 10 is provided with a crankshaft 14 rotatably supported by the cylinder block 11, and an intake camshaft 15 and an exhaust camshaft 16 that are rotatably supported by the cylinder head 12. An endless chain 17 is looped over the crankshaft 14 and the camshafts 15, 16, at a position on the right side (in FIG. 1) relative to the cylinder block 11. With this configuration, the rotation of the crankshaft 14 is transmitted to the camshafts 15, 16 through the chain 17.

The internal combustion engine 10 is provided with a first chain cover 18 attached to the cylinder head 12 and the cylinder block 11, and a second chain cover 19 attached to the first chain cover 18. The chain covers 18, 19 are secured to the cylinder head 12 with a fastening bolt 20. The chain 17 is disposed in a space defined by the chain covers 18, 19.

A mounting bracket 21 is provided on the opposite side of the second chain cover 19 from the first chain cover 18. The distal end of a shaft portion 201 of the fastening bolt 20 passed through the mounting bracket 21 reaches the cylinder head 12, whereby the chain covers 18, 19 are secured to the cylinder head 12. In this state, a head portion 202 of the fastening bolt 20 is engaged with the mounting bracket 21. With a tightening force generated by tightening the fastening bolt 20, the second chain cover 19 is pressed against the first chain cover 18 and the first chain cover 18 is pressed against the cylinder head 12.

Figure 3A:
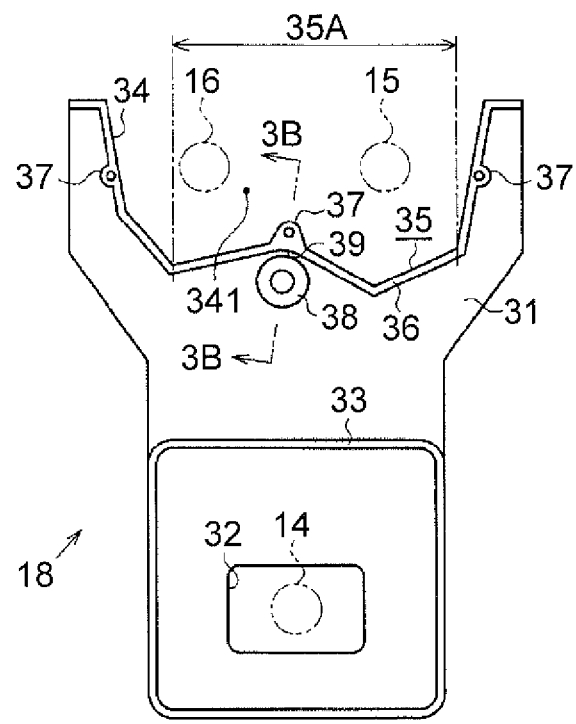
FIG. 3A is a plan view schematically illustrating a first chain cover.

Next, the first chain cover 18 will be described with reference to FIG. 3A and FIG. 3B. FIG. 3A illustrates an inner surface 31 of the first chain cover 18. The inner surface 31 faces the cylinder block 11 and the cylinder head 12.

As illustrated in FIG. 3A, a lower portion (in FIG. 3A) of the first chain cover 18 has a through-hole 32 through which the crankshaft 14 is passed. The lower portion of the first chain cover 18 is a portion that is attached to the cylinder block 11. Further, a lower portion (in FIG. 3A) of the inner surface 31 of the first chain cover 18 is provided with a flange 33 for a cylinder block. The flange 33 has a looped shape. A formed-in-place gasket (FIPG), which is an example of a liquid gasket, is provided at the distal end of the flange 33. When the first chain cover 18 is attached to the cylinder block 11 and the cylinder head 12, the flange 33 to which the FIPG has been applied is pressed against the cylinder block 11.

Further, an upper portion (in FIG. 3A) of the first chain cover 18 is provided with an edge portion 35 defining a cutout 34 for avoiding contact of the first chain cover 18 with the camshafts 15, 16. The upper portion of the first chain cover 18 is a portion that is attached to the cylinder head 12. The edge portion 35 defining the cutout 34 is positioned at the center of the upper portion (in FIG. 3A) of the first chain cover 18. When the first chain cover 18 is attached to the cylinder block 11 and the cylinder head 12, the camshafts 15, 16 are positioned in a space 341 located inward of the edge portion 35 defining the cutout 34.

Due to the provision of the cutout 34 in the first chain cover 18 as described above, a portion of the peripheral edge of the first chain cover 18 is positioned between the crankshaft 14 and the camshafts 15, 16. In the peripheral edge of the first chain cover 18, the edge portion formed in the first chain cover 18 due to provision of the cutout 34 in the first chain cover 18 will be simply referred to as "edge portion 35" in this specification. In this case, a portion of the edge portion 35, the portion extending transversely at a position between the crankshaft 14 and the camshafts 15, 16, corresponds to "specific edge portion 35A".

On the inner surface 31 of the first chain cover 18, a first flange 36 is provided at the edge portion 35 including the specific edge portion 35A. The first flange 36 does not have a looped shape, unlike the flange 33.

Figure 3B:
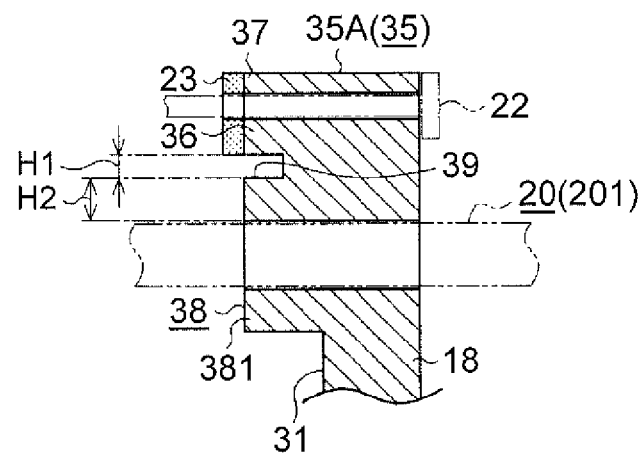
FIG. 3B is a sectional view taken along the line 3B-3B of the first chain cover.

As illustrated in FIG. 3A and FIG. 3B, a plurality of insertion portions 37 through which positioning bolts 22 are inserted is provided so as to project from the inner surface 31 of the first chain cover 18. The insertion portions 37 are used to align the first chain cover 18 and the cylinder head 12 with each other. The insertion portions 37 are integral with the first flange 36, and the distal end surface of each insertion portion 37 is flush with the distal end surface of the first flange 36.

As illustrated in FIG. 3A and FIG. 3B, the inner surface 31 of the first chain cover 18 is provided with a first boss 38 through which a shaft portion 201 of the fastening bolt 20 is passed. The distal end surface of the first boss 38 is flush with the distal end surface of the first flange 36. When the direction in which the intake camshaft 15 and the exhaust camshaft 16 are arranged side by side is defined as a prescribed direction, the first boss 38 is positioned between the intake camshaft 15 and the exhaust camshaft 16 in the prescribed direction, and the first boss 38 is adjacent to a portion of the first flange 36, the portion being provided at the specific edge portion 35A. The first boss 38 is positioned on the crankshaft 14 side (lower side in FIG. 3A) with respect to the specific edge portion 35A. Between the first flange 36 and the first boss 38, a first groove 39 is defined. A width H1 of the first groove 39 is very small, and is smaller than a width H2 of a peripheral wall 381 of the first boss 38. In other words, the first boss 38 is located close to the first flange 36.

In the process of attaching the first chain cover 18 to the cylinder head 12, a FIPG 23, which has not been cured, is applied to, for example, the distal end surface of the first flange 36. The FIPG 23 serves as an example of "liquid gasket". A FIPG is a material that is in the form of liquid at the time of application and cures with passage of time from the application. Due to application of a FIPG, portions to which the FIPG are applied can be bonded together and brought into close contact with each other.

Figure 4A:
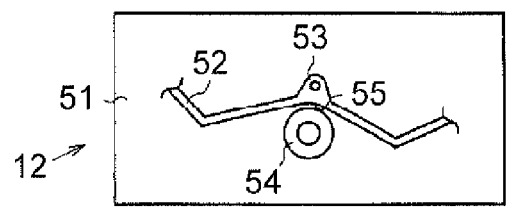
FIG. 4A is a plan view schematically illustrating an attachment surface of a cylinder head, to which the first chain cover is attached.

Next, an attachment surface 51 of the cylinder head 12, to which the first chain cover 18 is attached, will be described with reference to FIG. 4A and FIG. 4B. As illustrated in FIG. 4A, the attachment surface 51 of the cylinder head 12 is provided with a second flange 52 that faces the first flange 36 of the first chain cover 18. In other words, when the first chain cover 18 is attached to the cylinder head 12, the second flange 52 holds the FIPG 23 in cooperation with the first flange 36 in such a manner that the FIPG 23 is held between the second flange 52 and the first flange 36. Further the attachment surface 51 is provided with insertion portions 53 that are disposed coaxially with the insertion portions 37 of the first chain cover 18. The insertion portions 53 are integral with the second flange 52, and the distal end surface of each insertion portion 53 is flush with the distal end surface of the second flange 52. The distal ends of the positioning bolts 22 are inserted into the insertion portions 53 of the attachment surface 51.

Figure 4B:
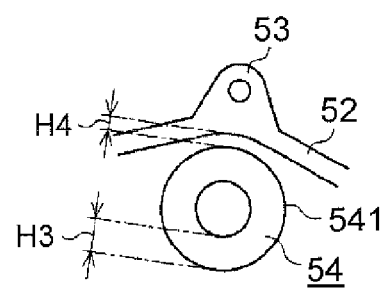
FIG. 4B is a partially-enlarged view of the cylinder head.

As illustrated in FIG. 4A and FIG. 4B, a second boss 54 is provided near the second flange 52 of the attachment surface 51. The second boss 54 is adjacent to the second flange 52, and the second boss 54 is disposed coaxially with the first boss 38 of the first chain cover 18. The shaft portion 201 of the fastening bolt 20 is inserted into the second boss 54. A width H3 of a peripheral wall 541 of the second boss 54 is equal to the width H2 of the peripheral wall 381 of the first boss 38.

In the present embodiment, a second groove 55 is provided between the second flange 52 and the second boss 54. A width H4 of the second groove 55 is substantially equal to the width H1 of the first groove 39. When the first chain cover 18 is attached to the cylinder head 12, the inside of the second groove 55 and the inside of the first groove 39 are brought into communication with each other.

Figure 5:
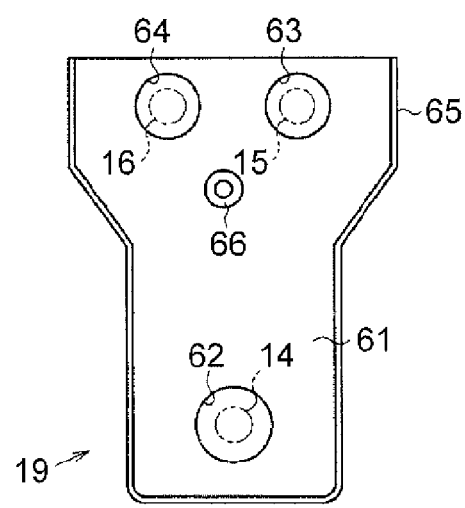
FIG. 5 is a plan view schematically illustrating a second chain cover.

Next, the second chain cover 19 will be described with reference to FIG. 5. FIG. 5 illustrates an inner surface 61 of the second chain cover 19. The inner surface 61 faces the first chain cover 18.

As illustrated in FIG. 5, the second chain cover 19 has a through-hole 62 through which the crankshaft 14 is passed, a through-hole 63 for the intake camshaft 15 and a through-hole 64 for the exhaust camshaft 16. Further, the inner surface 61 of the second chain cover 19 is provided with a third flange 65. The third flange 65 is provided at an edge portion of the peripheral edge of the second chain cover 19 other than an upper edge portion (in FIG. 5). When the second chain cover 19 is attached to the first chain cover 18, the third flange 65 is brought into contact with an edge portion of the peripheral edge of the first chain cover 18 other than the edge portion 35. In other words, the second chain cover 19 is not provided with a flange that is in contact with the edge portion 35 of the first chain cover 18.

Further, the inner surface 61 of the second chain cover 19 is provided with a third boss 66 through which the shaft portion 201 of the aforementioned fastening bolt 20 is passed. The third boss 66 is disposed coaxially with the first boss 38 of the first chain cover 18.

Next, the operation for securing each of the chain covers 18, 19 to the cylinder head 12 will be described with reference to FIG. 6 and FIG. 7. First, the FIPG 23, which has not been cured, is applied to at least one of the first flange 36 of the first chain cover 18 and the second flange 52 of the cylinder head 12. In this state, the first chain cover 18 is attached to the cylinder head 12. At this time, the positioning bolts 22 are inserted into the insertion portions 37 of the first chain cover 18 and the insertion portions 53 of the cylinder head 12. In this case, the FIPG 23 held between the first flange 36 and the second flange 52 has not yet cured. Thus, the FIPG 23 is hardly damaged even when the positioning bolts 22 are tightened.

Subsequently, the chain 17 is looped over the crankshaft 14 and the camshafts 15, 16. Next, the second chain cover 19 is attached to the first chain cover 18 such that the chain 17 is covered with the first and second chain covers 18, 19.

Figure 6:
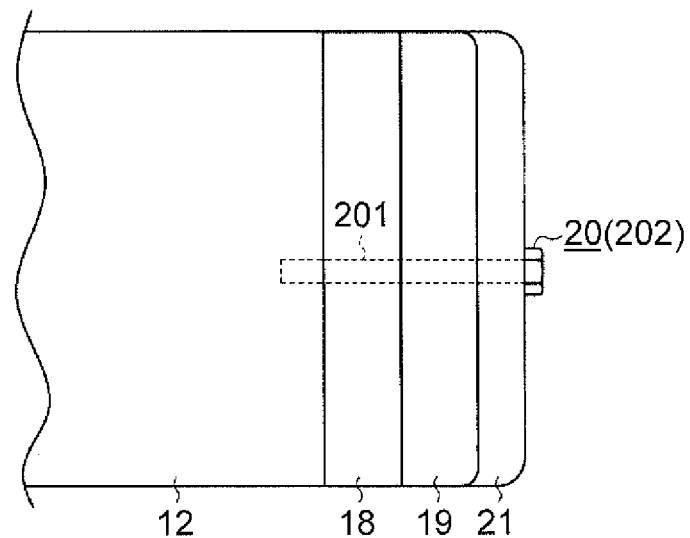
FIG. 6 is a schematic view of the internal combustion engine with a head cover omitted, as viewed from above.

Subsequently, as illustrated in FIG. 6, the chain covers 18, 19 are secured to the cylinder head 12 with the fastening bolt 20. In this case, the head portion 202 of the fastening bolt 20 is engaged with the mounting bracket 21, and thus the second chain cover 19 is pressed toward the first chain cover 18 by the mounting bracket 21. In this state, a major portion of the peripheral edge of the first chain cover 18, that is, a portion of the peripheral edge of the first chain cover 18 other than the edge portion 35 is pressed toward the cylinder head 12 by the peripheral edge of the second chain cover 19.

Figure 7:
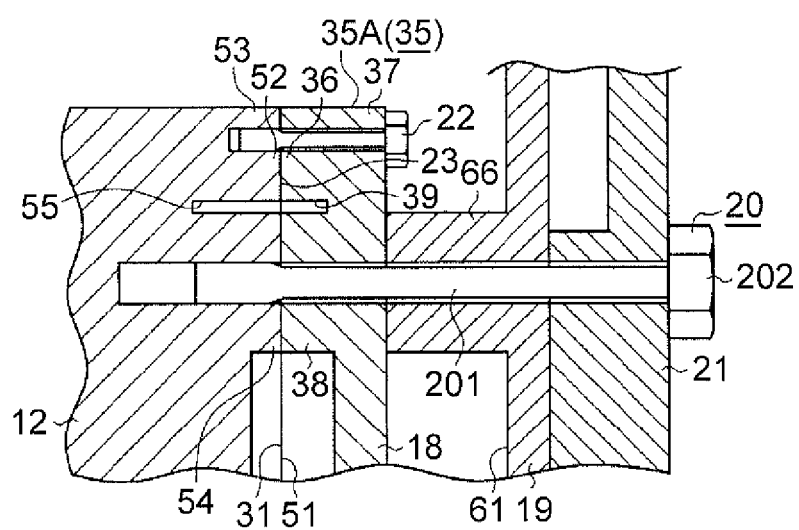
FIG. 7 is a partial sectional view illustrating the state where the chain covers are secured to the cylinder head with a fastening bolt in the internal combustion engine.

As illustrated in FIG. 7, the inner surface 31 of the edge portion 35 of the first chain cover 18 is provided with the first flange 36, and the first flange 36 faces the second flange 52 of the cylinder head 12 across the FIPG 23. The shaft portion 201 of the fastening bolt 20 is inserted into the first boss 38 and the second boss 54 provided close to the first flange 36 and the second flange 52, respectively. Thus, an axial force generated by tightening the fastening bolt 20 is transmitted to the FIPG 23 held between the first flange 36 and the second flange 52.

A FIPG has a property of starting curing with passage of time. Thus, at the time when the fastening bolt 20 is tightened, curing of the FIPG 23 positioned between the first flange 36 and the second flange 52 may have already started. When the fastening bolt 20 is tightened under the condition where the FIPG 23 is curing, if the axial force transmitted to the FIPG 23 is excessively large, damages given to the FIPG 23 due to the FIPG 23 being held between the first flange 36 and the second flange 52 becomes large, which may result in a decrease in durability of the FIPG 23.

In view of this, in the present embodiment, the first groove 39 is provided between the first flange 36 and the first boss 38, and the second groove 55 is provided between the second flange 52 and the second boss 54. Thus, rigidity of a portion of the first chain cover 18 between the first flange 36 and the first boss 38 and rigidity of a portion of the cylinder head 12 between the second flange 52 and the second boss 54 are both decreased. Consequently, even if the fastening bolt 20 is tightened under the condition where the FIPG 23 is curing, an axial force generated by tightening the fastening bolt 20 is less likely to be transmitted to the FIPG 23. As a result, the axial force to be transmitted to the FIPG 23 is prevented from being excessively large, and thus the FIPG 23 is less likely to be damaged.

The configuration and operation described above produces the following advantageous effects. (1) Even when an axial force is generated as the shaft portion 201 of the fastening bolt 20 is inserted into the bosses 38, 54, transmission of the axial force to the FIPG 23 is restricted by the grooves 39, 55. As a result, transmission of an excessively large axial force to the FIPG 23 is inhibited. In other words, even when the bosses 38, 54 are respectively provided close to the flanges 36, 52, an appropriate axial force is transmitted to the FIPG 23 and thus the FIPG 23 is brought into close contact with the flanges 36, 52. Consequently, it is possible to inhibit a decrease in durability of the FIPG 23 while ensuring sealing performance provided by the flanges 36, 52 and the FIPG 23, without the need to reduce a tightening force generated by tightening the fastening bolt 20.

(2) When the direction in which the camshafts 15, 16 are arranged side by side is defined as a prescribed direction, the first boss 38 and the second boss 54 are disposed near the center of the first flange 36 in the prescribed direction. Thus, an axial force generated by tightening the fastening bolt 20 is transmitted to the entirety of the FIPG 23 positioned between the first flange 36 and the second flange 52. Thus, sealing performance provided by the flanges 36, 52 and the FIPG 23 is easily ensured.

The above-described embodiment may be modified as follows. The second groove 55 need not be provided between the second flange 52 and the second boss 54 as long as the first groove 39 is provided between the first flange 36 and the first boss 38. In this case as well, an axial force is less likely to be transmitted to the FIPG 23 as compared with the case where no groove is provided between the first flange 36 and the first boss 38 and no groove is provided between the second flange 52 and the second boss 54. As a result, it is possible to inhibit a decrease in durability of the FIPG 23 while ensuring sealing performance provided by the flanges 36, 52 and the FIPG 23.

As long as the second groove 55 is provided between the second flange 52 and the second boss 54, the first groove 39 need not be provided between the first flange 36 and the first boss 38. In this case as well, an axial force is less likely to be transmitted to the FIPG 23 as compared with the case where no groove is provided between the first flange 36 and the first boss 38 and no groove is provided between the second flange 52 and the second boss 54. As a result, it is possible to inhibit a decrease in durability of the FIPG 23 while ensuring sealing performance provided by the flanges 36, 52 and the FIPG 23.

In the above-described embodiments, a FIPG is employed as a liquid gasket. However, the liquid gasket is not limited to FIPGs, and materials other than FIPGs may be employed as long as the materials are in the form of liquid at the time of application and cure with passage of time from the application and the materials enable the portions to which the materials are applied to be bonded together and to be brought into close contact with each other.

What is claimed is:

1. An internal combustion engine comprising:
a cylinder head;
a crankshaft;
an intake camshaft and an exhaust camshaft disposed in the cylinder head;
a first chain cover disposed in contact with the cylinder head;
a second chain cover disposed in contact with the first chain cover;
a chain looped over the crankshaft, the intake camshaft, and the exhaust camshaft, the chain being disposed in a space defined by the first chain cover and the second chain cover; and
a fastening bolt that fastens the first chain cover and the second chain cover to the cylinder head, wherein
the first chain cover includes an edge portion defining a cutout such that the intake camshaft and the exhaust camshaft are positioned in a space in the cutout,
a portion of a peripheral edge portion of the cutout is a specific edge portion positioned between the crankshaft and the intake and exhaust camshafts,
the first chain cover includes a first flange positioned at the specific edge portion and a first boss through which a shaft portion of the fastening bolt is passed, the first boss being disposed adjacent to the first flange, and the first boss being located on the crankshaft side with respect to the first flange, the cylinder head includes a second flange that holds a liquid gasket in cooperation with the first flange in such a manner that the liquid gasket is held between the second flange and the first flange, and a second boss into which the shaft portion of the fastening bolt is inserted, the second boss being disposed coaxially with the first boss, and a groove is provided in at least one of a position between the first flange and the first boss of the first chain cover and a position between the second flange and the second boss of the cylinder head.

2. The internal combustion engine according to claim 1, wherein the first boss and the second boss are positioned between the intake camshaft and the exhaust camshaft in a direction in which the intake camshaft and the exhaust camshaft are arranged side by side.

3. The internal combustion engine according to claim 2, wherein a width of the groove is smaller than a width of each of a peripheral wall of the first boss and a peripheral wall of the second boss.

4. The internal combustion engine according to claim 1, wherein a width of the groove is smaller than a width of each of a peripheral wall of the first boss and a peripheral wall of the second boss.

\* \* \* \* \*